(12) United States Patent
Kumar Sharma

(10) Patent No.: US 12,259,706 B2
(45) Date of Patent: Mar. 25, 2025

(54) METHOD AND APPARATUS FOR MONITORING OF ELECTRIC DRIVES IN AN INDUSTRIAL SYSTEM

(71) Applicant: ABB Schweiz AG, Baden (CH)

(72) Inventor: Saurabh Kumar Sharma, Bangalore (IN)

(73) Assignee: ABB Schweiz AG, Baden (CH)

( * ) Notice: Subject to any disclaimer, the term of this patent is extended or adjusted under 35 U.S.C. 154(b) by 378 days.

(21) Appl. No.: 17/736,199

(22) Filed: May 4, 2022

(65) Prior Publication Data

US 2022/0260965 A1    Aug. 18, 2022

Related U.S. Application Data

(63) Continuation of application No. PCT/IB2020/060282, filed on Nov. 3, 2020.

(30) Foreign Application Priority Data

Nov. 5, 2019    (IN) ............................. 201941044782

(51) Int. Cl.
  *G05B 19/406*    (2006.01)
(52) U.S. Cl.
  CPC .. *G05B 19/406* (2013.01); *G05B 2219/31449* (2013.01)
(58) Field of Classification Search
  CPC ................... G05B 2219/31449; G05B 19/406
  USPC ......................................................... 700/28
  See application file for complete search history.

(56) References Cited

U.S. PATENT DOCUMENTS

| | | | | |
|---|---|---|---|---|
| 2014/0337429 A1* | 11/2014 | Asenjo | ................... | H04L 67/10 |
| | | | | 709/204 |
| 2020/0103885 A1* | 4/2020 | Pani | ....................... | G07C 3/005 |
| 2020/0132773 A1* | 4/2020 | Gugaliya | ................ | G07C 3/14 |

FOREIGN PATENT DOCUMENTS

EP    2801935 A1    11/2014

OTHER PUBLICATIONS

ABB Industry OY, "Installation and Start-up Guide—ACS 400 DDCS Option Module," *ABB Library*, 33 pp. (Jan. 15, 1999).
University of Cincinnati, "Universal File Formats for Modal Analysis Testing," Webpage downloaded from the Internet on May 3, 2022, at https://www.ceas3.uc.edu/sdrluff/, 3 pp.

(Continued)

*Primary Examiner* — Jigneshkumar C Patel
(74) *Attorney, Agent, or Firm* — Leydig, Voit & Mayer, Ltd.

(57) ABSTRACT

A method of monitoring an industrial plant, implemented by an apparatus, includes receiving operational data from each of a plurality of electric drives via a corresponding communication interface. The method further includes converting the operational data from a pre-determined data format to a machine-readable data format and determining a plurality of events for each of the plurality of drives based on the corresponding machine-readable data. The method includes determining a plurality of critical events corresponding to the plurality of drives based on the plurality of events and generating a recommendation based on at least one of the plurality of critical events. The method also includes presenting the recommendation on an output device in a human readable format.

15 Claims, 5 Drawing Sheets

(56) References Cited

OTHER PUBLICATIONS

Yokogawa Electric Corporation, "Waveform Viewer for DL series—User's Manual," downloaded from the Internet on May 2, 2022, at https://cdn.tmi.yokogawa.com/IM700919-61E.pdf, 8th edition, 56 pp. (Oct. 2003).
European Patent Office, International Search Report in International Patent Application No. PCT/IB2020/060282, 7 pp. (Apr. 21, 2021).
European Patent Office, Written Opinion in International Patent Application No. PCT/IB2020/060282, 12 pp. (Apr. 21, 2021).

* cited by examiner

METHOD AND APPARATUS FOR MONITORING OF ELECTRIC DRIVES IN AN INDUSTRIAL SYSTEM

CROSS-REFERENCE TO RELATED APPLICATIONS

This patent application claims priority to International Patent Application No. PCT/IB2020/060282, filed on Nov. 3, 2020, which claims priority to Indian Patent Application No. 201941044782, filed on Nov. 5, 2019, both of which are incorporated herein in their entirety by reference.

FIELD OF THE DISCLOSURE

Embodiments of the present specification relate generally to maintenance of electric drives and, more particularly, to monitoring electric drives of an industrial system and generating operational recommendations.

BACKGROUND OF THE INVENTION

Electric drives are typical equipment that are used to control motion of electromechanical machines in an industrial system. Electric drives constitute a critical component in various process industries such as, but not limited to, electrical power, petrochemicals, food and beverage industries. The electric drives are employed for controlling the mechanical power delivered by a motor and to operate a variety of loads such as fans, blowers, compressor, conveyors, and machine tools among a variety of motion control applications.

Fault diagnosis and correction of an industrial asset or its components is a critical capability required by industrial systems and are performed by monitoring the operational data generated by the asset. The fault diagnosis may also require processing of symptoms and data generated by other associated components. In case of electric drives, drive current, drive voltage and other electrical parameters may be generally monitored. However, a fault in an electric drive may also be responsible for symptoms such as, but not limited to, overheat in drive control board, over speed in one or more motors controlled by the electric drive, and stall conditions in one or more motors or processes controlled by the electric drive.

Fault diagnosis is typically initiated upon reception of a service request and involves sophisticated analysis and processing of operational data. The operational data also includes event data associated with the recent working of the industrial component. The operational data is stored in data recording devices, referred as black boxes, located within the industrial assets. Conventionally, expert field personnel visit the customer site reporting a problem and retrieve manually data from the black box associated with the industrial asset under investigation for analysis and fault diagnosis. Each industrial asset is configured to store the operational data in a native data format either in a binary format or in a text format. Preprocessing of the operational data and data conversion are necessarily undertaken by the field personnel before initiating the investigation of the reporting problem.

Manual processing at an industrial location involves risk of human error, enhanced cost of operation and introduces inefficiency in the maintenance process. Remote monitoring may not a possible option due to varying capabilities of deployed assets. Specifically, certain industrial drives may not have the capability to communicate logged data to a central location for analysis. Such drives may have been commissioned long time ago, and lack the hardware, software and/or firmware capabilities to communicate the logged data. In case of these drives, an explicit service request is necessary to initiate deployment of service personnel to the industrial site for acquisition of the logged data.

Predictive maintenance and/or detection of root cause of faulty conditions is also a necessity when multiple drives are deployed in the industrial site. There is a need for an elegant technique for servicing of industrial components employing a variety of native data structures and data encoding methods.

BRIEF SUMMARY OF THE INVENTION

In accordance with one aspect of the present disclosure, a method for monitoring an industrial plant includes a plurality of electric drives. The method includes receiving operational data from each of the plurality of electric drives via a corresponding communication interface. The operational data is represented in one or more pre-determined data formats. The method further includes converting the operational data from a pre-determined data format to a machine-readable data format. The machine-readable data is represented in one or more secondary data formats. The decoder is selected based on identity of the electric drive generating the operational data. The method also includes determining a plurality of events for each of the plurality of drives based on the corresponding machine-readable data. Each of the plurality of events is representative of an operating condition corresponding to the electric drive generating the operational data. The method includes determining a plurality of critical events corresponding to the plurality of drives based on the plurality of events. The plurality of critical events is representative of abnormal operating conditions corresponding to the plurality of drives. The method further includes generating a recommendation based on at least one of the plurality of critical events using historical knowledge base. The recommendation comprises a schedule for service. The method also includes presenting the recommendation on an output device in a human readable format.

In accordance with another aspect of the present disclosure, an apparatus for monitoring an industrial plant having a plurality of electric drives includes a data receiving unit configured to receive operational data from each of the plurality of electric drives via a corresponding communication interface. The operational data is represented in one or more pre-determined data formats. The apparatus further includes a data format converter unit communicatively coupled to the data receiving unit and configured to convert the operational data using a decoder to generate machine-readable data. The machine-readable data is represented in one or more secondary data formats. The decoder is selected based on identity of the electric drive generating the operational data. The apparatus also includes an analytics engine communicatively coupled to the data format converter unit and configured to determine a plurality of events for each of the plurality of drives based on the corresponding machine-readable data. Each of the plurality of events is representative of an operating condition corresponding to the electric drive generating the operational data. The analytics engine is further configured to determine a plurality of critical events corresponding to the plurality of drives based on analyzing the plurality of events corresponding to each of the plurality of drives using one or more analytic techniques. The plurality of critical events is representative of abnormal operating conditions corresponding to the plurality of drives. The analytics engine is also configured to generate a recommendation based on at least one of the plurality of critical events using historical knowledge base. The recommendation comprises a schedule for service. The apparatus also includes a human-machine interface communicatively coupled to the analytics engine and configured to present the recommendation on an output device in a human readable format.

BRIEF DESCRIPTION OF THE SEVERAL VIEWS OF THE DRAWING(S)

The various features and aspects of embodiments of the present invention will become better understood when the following detailed description is read with reference to the accompanying drawings in which like characters represent like parts throughout the drawings.

DETAILED DESCRIPTION OF THE INVENTION

Figure 1:
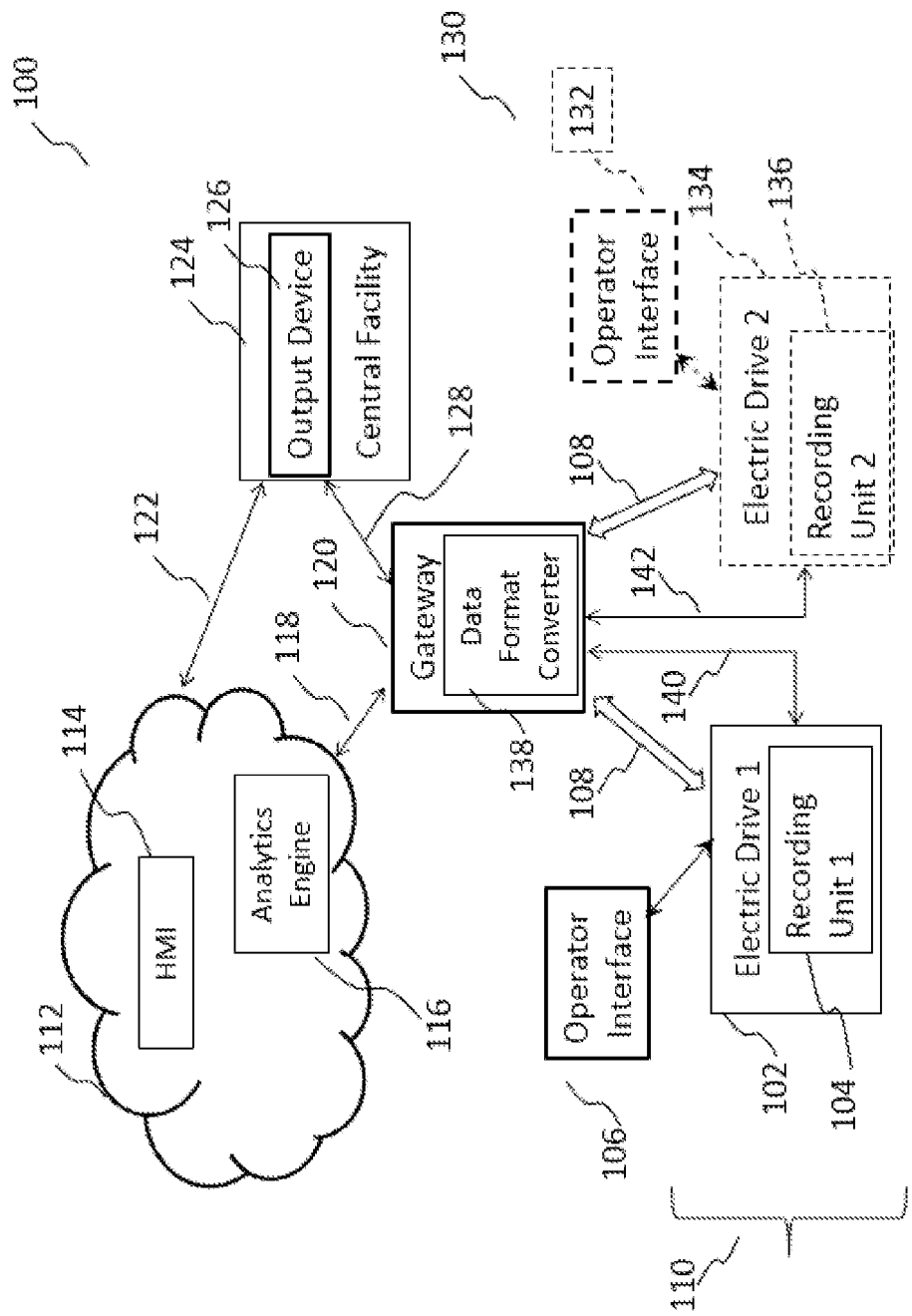
FIG. 1 is a diagrammatic illustration of a system for monitoring an industrial plant in accordance with an exemplary embodiment of the present disclosure.

As will be described in detail hereinafter, embodiments of monitoring electric drives in an industrial plant, and more particularly monitoring for preventive maintenance and/or detection of root cause of faulty conditions of electric drives in the industrial plant are presented.

The present disclosure describes a method for monitoring an industrial plant having a plurality of electric drives. In general, the technique provided herein is applicable for monitoring equipment and devices in any industrial plant. The present invention further provides an apparatus that implements the method of monitoring the industrial assets. The disclosure also describes a system for incorporating the apparatus used for monitoring the industrial plant. The technique of monitoring disclosed herein may be used to create infrastructure for servicing or preventive maintenance of industrial assets. The technique of monitoring may also be integrated with the industrial plant using suitable hardware and software components.

Industrial plant typically includes equipment and devices synergistically configured to provide planned production. The technique of monitoring such an industrial plant is based on operational data received from each of the plurality of electric drives via a corresponding communication interface. The phrase "operational data" refers to data generated by or data logged by an equipment such as an electric drive in the industrial plant.

In one embodiment of the present disclosure, the communication interface is a fiber optic based communication interface. The communication interface establishes a communication path between an electric drive and a gateway of the industrial plant. In place of the gateway, the communication path can be established with other devices such as industrial controllers, PLCs etc. One end of the fiber optic cable is connected to trans-receiver port of the drive and the other end is connected to a field bus adapter of the gateway. The communication protocol may be based on a ring network with the plurality of drives connected to one another in a circular fashion. Specifically, nodes of the ring network are electric drives of the industrial plant. The gateway polls the nodes of the ring sequentially and the polled drives transmit the data to the gateway. In some instances, the electric drives may also prompt the gateway to indicate its readiness to transmit data and the gateway may initiate the polling of that particular drive unit. In an alternate embodiment, a plurality of electric drives may be coupled with an optical hub via the optical fiber based communication interface. The optical hub in this embodiment serves as a data multiplexer. In such an embodiment, the optical hub establishes one/two way communication with the gateway. The gateway in turn is able to establish wired and/or wireless communication with a server (e.g. cloud) for exchange of data to/from the electric drives.

The phrase "data format" refers to a data structure or a file structure used to represent the operational data. It may be noted that the electric drives use specific pre-determined data formats specified by the manufacturers and are closely related to the hardware and configuration details of the electric drives. In conventional electric drives providing basic functionalities, the operational data is logged into a built-in memory and is retrieved using computer based software. The present invention is specifically suited to electric drives which do not have inbuilt ability to communicate with other electric drives, gateway or with cloud infrastructure.

The technique of monitoring the industrial plant in accordance with the disclosed embodiments requires converting the operational data using a decoder to generate machine-readable data. The machine-readable data is represented in one or more secondary data formats. Typically, one of a plurality of decoders is used to convert the operational data in one of the multiple pre-determined data formats to one of the plurality of secondary data formats. The decoder is selected based on identity of the electric drive generating the operational data. Specifically, in some embodiments, the decoder is selected based on identity of a recording unit located in the electric drive. The identity of the recording unit includes a unique identity number for the recording unit and/or type of the recording unit. The apparatus for monitoring the industrial plant includes a plurality of decoders corresponding to the plurality of electric drives it supports. The apparatus is configured to receive operational data corresponding to each of the plurality of electric drives. Further, the apparatus is configured to convert the operational data of each of the electric drives to corresponding machine-readable data using a suitable decoder among the plurality of decoders.

The technique of monitoring the industrial plant uses a plurality of events extracted from the machine-readable data corresponding to each of the plurality of electric drives. The term 'event' referred herein is representative of an operating condition corresponding to the electric drive generating the operational data. The plurality of events corresponding to each of the electric drive includes many non-critical events and a small number of critical events. The phrase 'critical event' refers to events that represent abnormal operating conditions of the electric drive that need immediate attention. Critical-events may be representative of an imminent breakdown condition. Non-critical events refer to events that do not require immediate attention and may be attended subsequently in time.

The technique of monitoring the industrial plant is also based on determining a plurality of critical events corresponding to the plurality of drives. Critical events corresponding to each drive is determined by analyzing corresponding plurality of events using one or more analytic techniques. The plurality of critical events is representative of abnormal operating conditions and/or faults corresponding to the plurality of drives. Further, the technique of monitoring the industrial plant includes generating a recommendation based on at least one of the plurality of critical events. The term 'recommendation' refers to a course of actions to be implemented in the industrial plant to avoid disruption in plant operation. In one embodiment, the at least one critical events are compared with critical events stored in a historical knowledge base and retrieving a recommendation associated with matching event of the database storing the historical knowledge base. The phrase 'historical knowledge base' refers to a labeled datasets generated using the historical data validated by domain experts. It may be noted herein that in some embodiments, the historical knowledge base may also take the form of an expert system. The recommendation may include a schedule for service. The recommendation is translated to a human consumable format, such as but not limited to, a text, an audio signal or a visual/video format. The technique of monitoring the industrial plant includes presenting the recommendation on an output device of the industrial plant. The recommendation may be either provided to an operator or a controller for generating a control action.

FIG. 1 is a diagrammatic illustration of a system 100 for monitoring an industrial plant in accordance with an exemplary embodiment. The system 100 includes an industrial plant 110 having a plurality of electric drives 102, 134 generating operational data 108. The plurality of electric drives 102, 134 is provided with respective recording units 104, 136 for storing the generated operational data. The electric drives 102, 134 may also be provided with operator interfaces 106, 132 as depicted in the illustrated embodiment. The system 100 also includes a gateway 120 communicatively coupled to a cloud infrastructure 112 having enhanced storage, computational and analytical capabilities. In some embodiments, a server facility (e.g. hosted in the industrial plant 110) may be available instead of the cloud infrastructure 112. The gateway 120 is also interfaced with an output device monitored either at a central facility 124 such as a service center or in an operator room having access to the plant infrastructure 110, 106, 128 and cloud infrastructure 112. The cloud infrastructure 112 may include computational and storage resources enough to support a plurality of electric drives 102, 134 of a single plant or multiple plants that are geographically distributed. The cloud infrastructure 112 further includes an analytics engine 116 providing analytics and learning capabilities for processing the operational data. The gateway 120 further includes a data format converter 138 having a plurality of decoders.

Although the system 100 is illustrated as a distributed system, components of the present system may also be realized as an apparatus co-located within a plant or within a service center facility. In one embodiment, a server located within the plant may perform the functionalities provided by the gateway 120, the cloud infrastructure 112 and the output device 124. The plant monitoring apparatus is further explained with reference to FIG. 2 in subsequent paragraphs.

The functionalities of the system 100 may also be provided by a computer readable medium storing a program having instructions readable by one or more processors to perform the functionalities required for monitoring the industrial plant.

Each of the plurality of electric drives 102, 134 is configured to generate operational data 108 in a pre-determined format. The pre-determined data format is determined by the manufacturer, capacity of recording units 104, 136, nature of the data logged by the electric drives and other such considerations. The operational data 108 logged by the electric drive 102 may be accessed by operator interface 106. Similarly, the operational data logged by the electric drive 134 in the recording unit 136 is accessible by the interface 132. The pre-determined data format includes at least one of Universal File Format (UFF), Waveform Data Format (WVF), High Dynamic Range (HDR) image format and a text format. It may be noted herein that the pre-determined data format may include any other format as provided by a specific manufacturer. Further, each of the plurality of electric drives 102, 134 is connected to the gateway 120 via a respective fiber optic based communication interface 140, 142. The fiber optic interface 140 is connected between a trans-receiver port of the electric drive 102 and field bus adapter of the gateway 120. Similarly, the fiber optic interface 142 is connected between a trans-receiver port of the electric drive 134 and the field bus adapter of the gateway 120. It may be noted herein that the communication interface 140, 142 may be created based on any other type of physical cables.

The operational data 108 generated by the respective electric drives 102, 134 are logged into the respective recording units 104, 136 in specific pre-determined formats. The gateway 120 is configured to access the operational data 108 stored in pre-determined formats in multiple recording units 104, 136. The data format converter 138 of the gateway 120 is configured to convert the operational data 108 from multiple pre-determined formats into a machine-readable format suitable for processing in the cloud infrastructure 112. The analytics engine 116 of the cloud infrastructure 112 is configured to provide advanced analytics for the operational data 108 in machine-readable format. It may be noted that advanced analytics refers to, but is not limited to, a machine learning technique, a regression technique and a classification technique. The analytics engine 116 is also configured to determine a plurality of events corresponding to the plurality of electric drives 102, 134 and select a subset of critical events among the plurality of events. The critical events correspond to the plurality of electric drives 102, 134. The analytics engine 116 is also configured to generate one or more recommendations corresponding to one or more of the electric drives 102, 134. The analytics engine 116 is configured to present the recommendation on the output device 126 in a central facility 124 via a human machine interface (HMI) 114.

Figure 2:
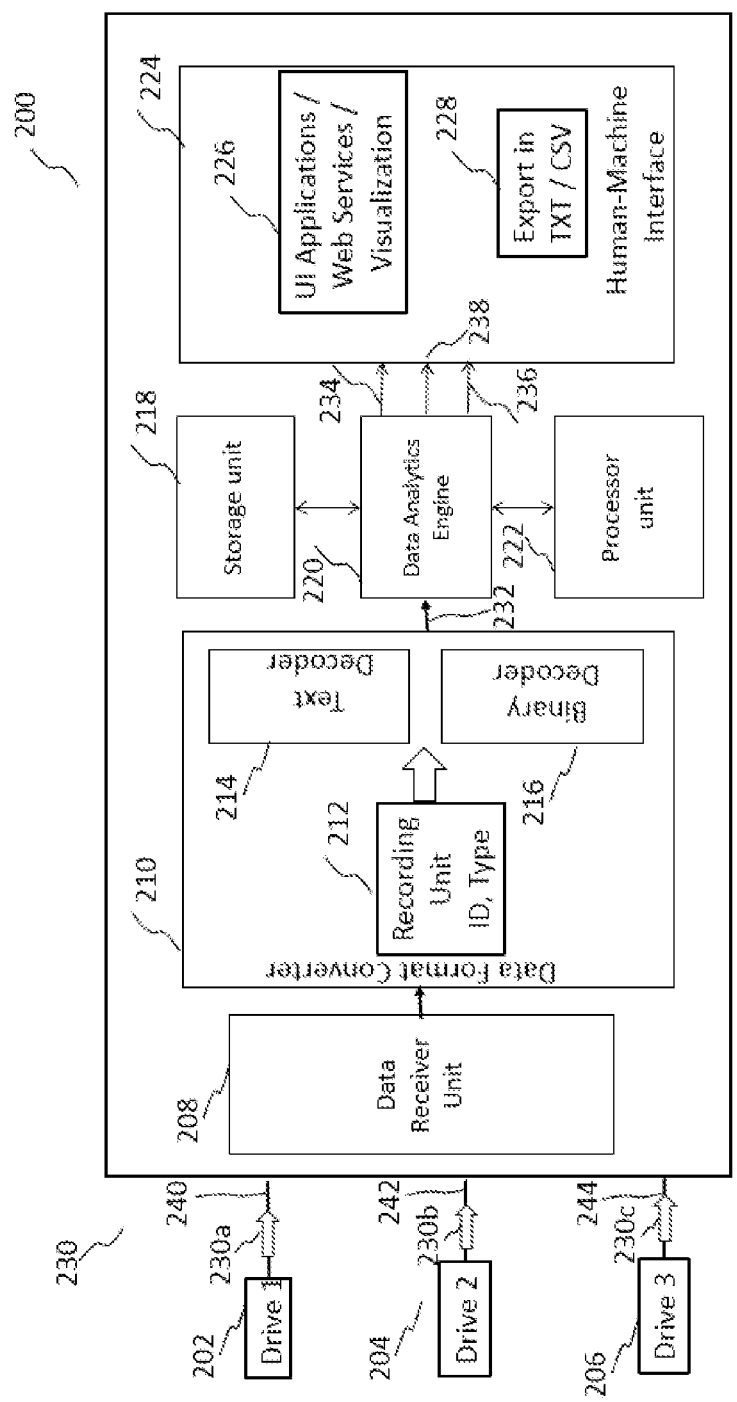
FIG. 2 is a block diagram illustrating an apparatus for monitoring the industrial plant using a data format converter in accordance with an exemplary embodiment of the present disclosure.

FIG. 2 is a block diagram illustrating an apparatus 200 for monitoring the industrial plant in accordance with an exemplary embodiment. In embodiments of the present invention, the apparatus 200 may be in the form of a gateway 120. In alternative embodiments, the apparatus 200 may be in the form of a stand-alone processor communicatively coupled with the gateway 120. In some other alternate embodiments, the apparatus 200 may be distributed, where some parts/components of the apparatus are provided on the gateway 120, and some provided on the server (such as on cloud 112). The apparatus 200 is configured to receive operational data 230 (e.g. including 230a, 230ba and 230c) from a plurality of electric drives 202, 204, 206 and generate recommendations 238. Such recommendations may be in the form of text and comma separated values format 228. The plurality of drives 202, 204, 206 is coupled to the apparatus 200 via a plurality of communication interfaces 240, 242, 244 respectively. The apparatus 200 includes a data receiver unit 208, a data format converter 210, a storage unit 218, a data analytics engine 220, a processor unit 222, and a human machine interface (HMI) 224. The data receiver unit 208 is configured to receive the operational data 230 and organize the operational data in multiple formats using a plurality of data structures. The data formats and the data structures used by the data receiver unit 208 are explained in subsequent paragraphs with reference to FIG. 3. The data format converter 210 is configured to access attributes 212 of electric drive from the operational data 230 provided by the data receiver unit 208. The attributes 212 of an electric drive include, but are not limited to, identity number and type of one of the electric drives 202, 204, 206 generating the operational data 230. The data format converter 210 is configured to select a decoder among a plurality of decoders 214, 216 based on the attributes 212 of the electric drive generating the operational data 230. Alternatively, the format converter 210 is configured to select a decoder based on a type of recording unit and an identity of the recording unit. The plurality of decoders includes a binary decoder 216 and a text decoder 214. Further, the text decoder 214 may include more than one decoders configured to cater to multiple text formats. Similarly, the binary decoder 216 may include more than one decoders to support multiple binary formats. The HMI 224 further includes user interface (UI) applications, and web services 226 facilitating visualization capabilities.

In one embodiment, the data receiver unit 208 of the apparatus 200 receives operational data 230a, 230b, 230c generated respectively by the plurality of drives 202, 204, 206 via separate communication interfaces 240, 242, 244. The communication interfaces 240, 242, 244 are physical communication paths realized by optic fiber based communication links. The operational data 230a, 230b, 230c may be in different formats such as, but not limited to, one of a plurality of binary formats or one of a plurality of text formats. The data format converter 210 converts each of the operational data 230a, 230b, 230c into a machine-readable format 232 required by the data analytics engine 220. It may be noted that the machine-readable format may be in one or more data formats that are supported by the data analytics engine 220. The data analytics engine 220 is configured to perform statistical analysis using techniques such as, but not limited to, classification and regression of data. The data analytics engine 220 is also configured to determine machine learning models and/or deep learning models using historical labeled datasets. The data analytics engine 220 is configured to determine a plurality of events 234 using the operational data 230a, 230b, 230c using one or more analytical processing methods. The data analytics engine 220 is also configured to determine a plurality of critical events 236 among the plurality of events 234 using historical data. One or more statistical analysis techniques may be used to determine the plurality of critical events 236. The data analytics engine 220 is also configured to determine at least one recommendation 238 based on the one or more of the plurality of critical events 236.

The storage unit 218 may include memory units (e.g. database units) of various types to support storage of operational data 230, files in various formats of binary and text data, event data 234, 236 and recommendations 238. In specific embodiments, the storage unit 218 may include read only memory (ROM) modules, random access memory (RAM) modules, programmable ROM (PROM) modules, erasable ROM (EPROM) and electrically erasable PROM (EEPROM) modules. The storage unit 218 may also include a structured database such as, but not limited to, a structured query language (SQL) database, a non-SQL based database or a combination of both type of databases.

The processor unit 222 includes one or more processing elements configured to perform one or more functions provided by various units of the apparatus 200. Specifically, the processor unit 222 includes computing elements such as, but not limited to, microcontrollers, general purpose processors, application specific integrated circuits (ASICs) and field programmable gate array (FPGA). The processor unit 222 in some embodiments may also include an EDGE processor communicatively coupled with the electric drives 202, 204, 206 providing an intermediate processing option.

Figure 3:
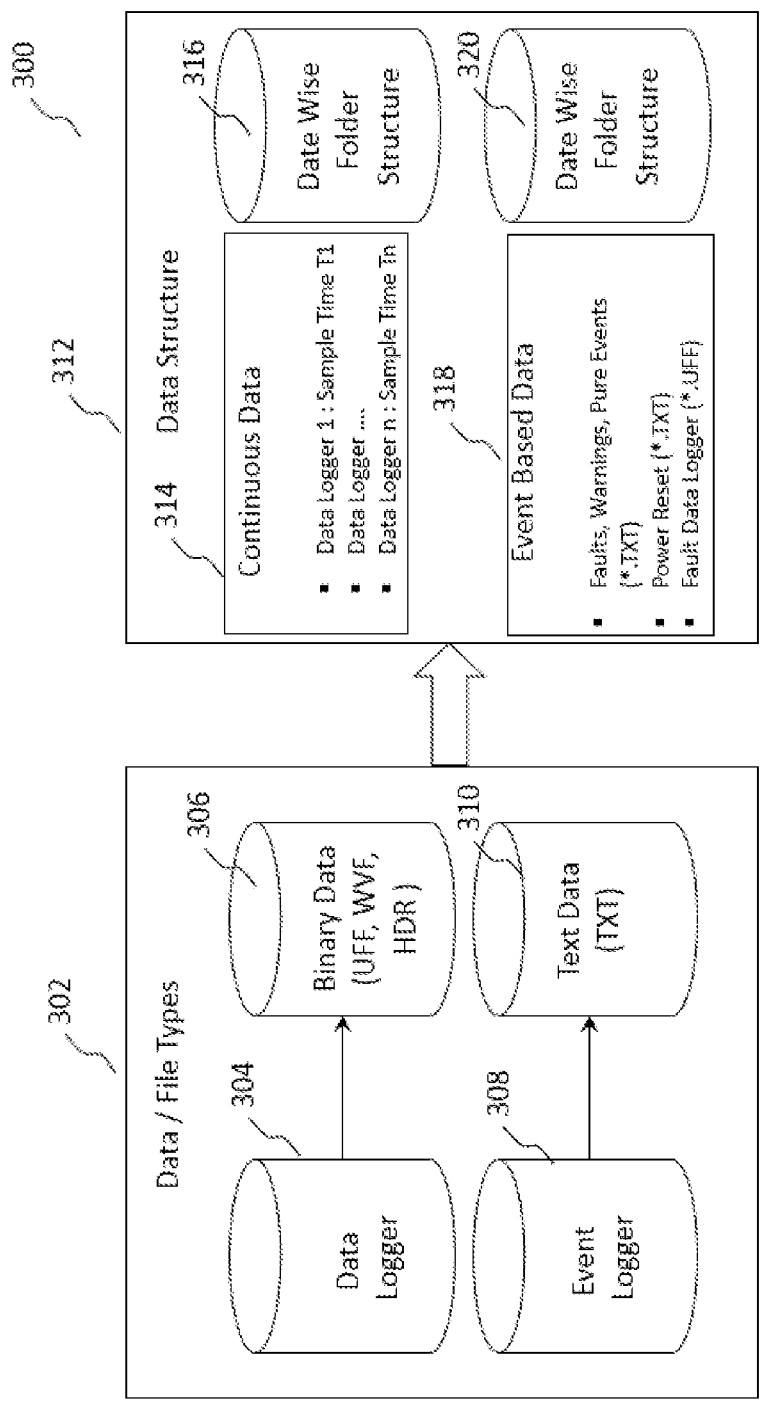
FIG. 3 is a schematic representation of native data structures and data encoding schemes employed in exemplary embodiments of the present disclosure.

FIG. 3 is a schematic 300 representation of native data structures and data encoding schemes employed in exemplary embodiments of the present specification. The schematic 300 illustrates data file types 302 and data structures 312 used by the data receiver unit 208 of FIG. 2. The operational data (108 in FIGS. 1 and 230 in FIG. 2) includes binary data 306 provided by a data logger 304 of an electric drive and text data 310 provided by an event logger 308 of the electric drive. Both the binary data 306 and the text data 310 are stored in respective date wise folders 316 and 320 respectively. It may be noted herein that the date wise folders 316 and 320 may include files in binary data formats 306 and files in text data formats 310. The date wise folders 316 represent continuous data and the date wise folder structure 320 include event based data. Continuous data for each date includes data from each of the plurality of data loggers corresponding to multiple logger time instants as represented by reference numeral 314. Similarly, the event based data 318 for each date includes data from each of the plurality of event data loggers. The plurality of events includes, but not limited to, faults, warnings, abnormal operating conditions and normal operating conditions. The events also include power reset events. The event based data 318 includes fault related data in binary format.

Figure 4:
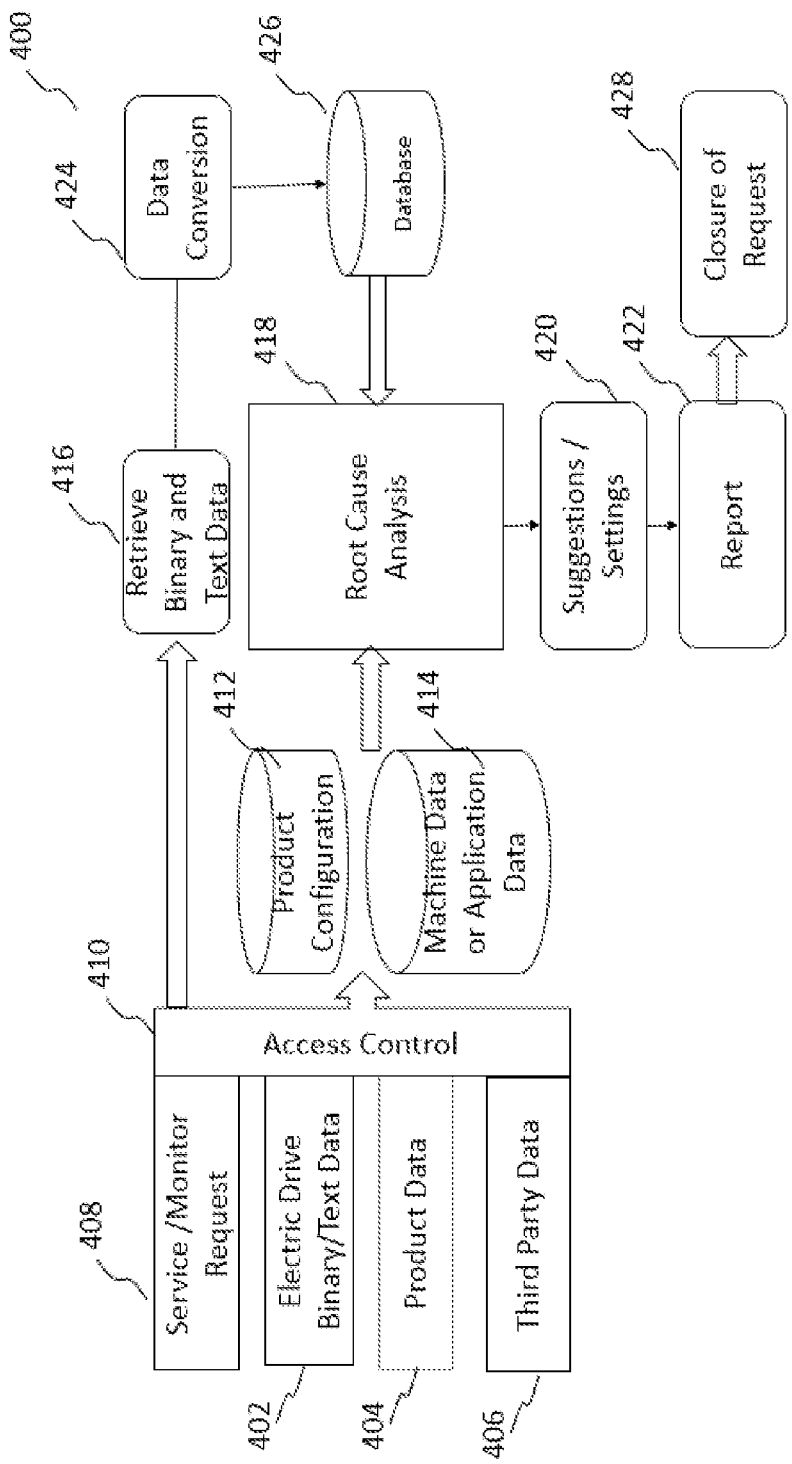
FIG. 4 is a schematic work flow used in monitoring of the industrial plant in accordance with an exemplary embodiment of the present disclosure.

FIG. 4 is a schematic work flow 400 used in monitoring of the industrial plant in accordance with an exemplary embodiment. The workflow 400 is initiated with a service or monitoring request 408 by an operator. When the service/monitoring request 408 is received, data from electric drive 402, product related data 404 and third-party data 406 is also collected via access control mechanism 410. The data 402, 404, 406, 408 in the multiple binary/text formats is retrieved as illustrated in 416 and converted to machine-readable format(s) as shown in 424. The machine-readable data is updated in a database 426 and used for root cause analysis 418 performed by an analytics engine. In one embodiment, product configuration data 412 and the machine related/application related data 414 are also used for root cause analysis. Based on the root cause analysis at 418, at least one of a suggestion, a recommendation and an equipment setting is generated at 420. A report 422 is generated based on the recommendations 420 and the request generated at 408 is closed at step 428.

Figure 5:
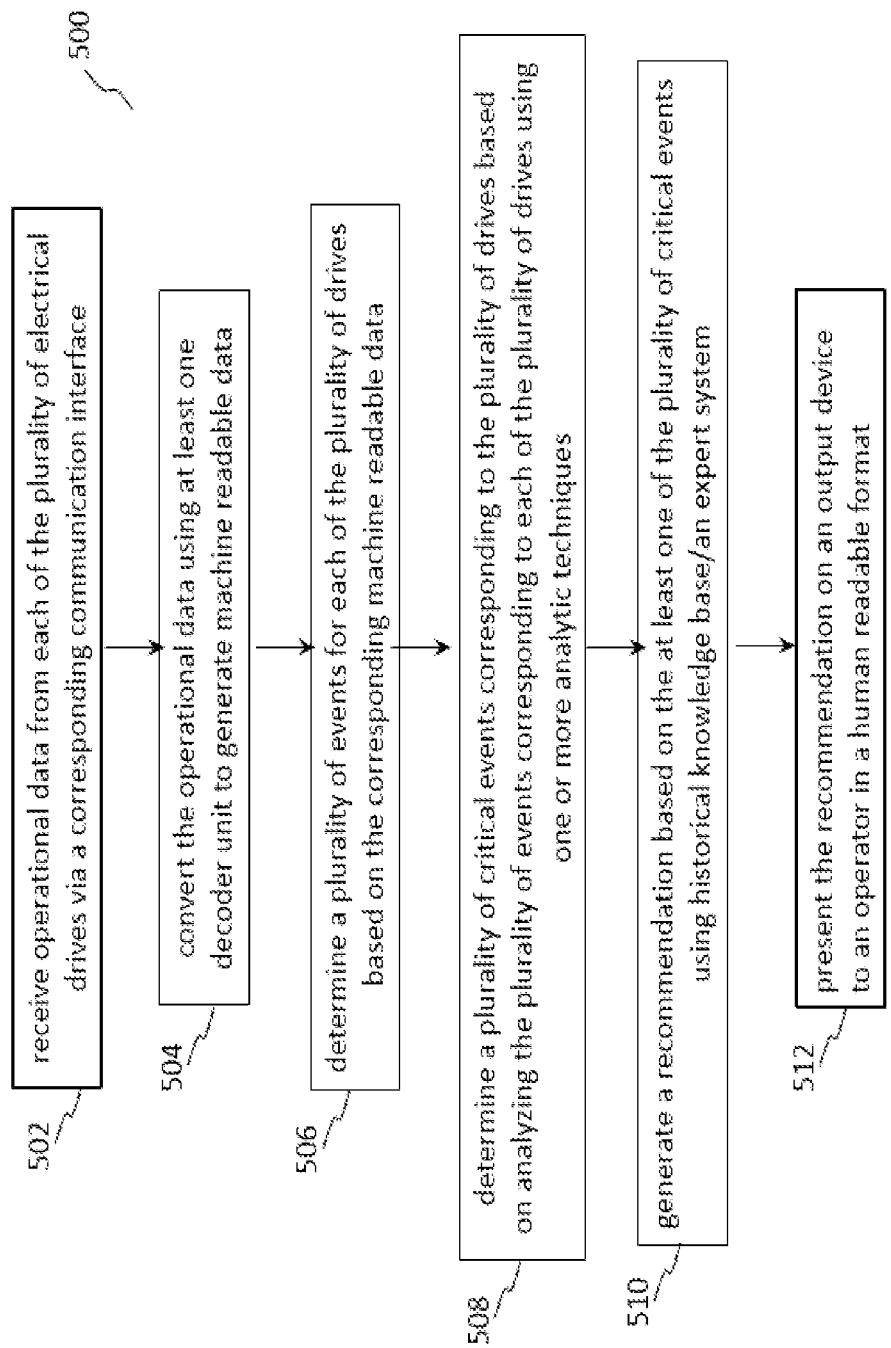
FIG. 5 is a flow chart of a method of monitoring the industrial plant in accordance with an exemplary embodiment of the present disclosure.

FIG. 5 is a flow chart of a method 500 of monitoring the industrial plant in accordance with an exemplary embodiment. The method 500 includes receiving operational data from each of the plurality of electric drives via a corresponding communication interface. In one embodiment, the communication interface is a distributed drive communication system (DDCS) interface. The operational data is represented in one or more pre-determined data formats. In one embodiment, the pre-determined data format includes at least one of Universal File Format (UFF), Waveform Data Format (WVF), High Dynamic Range (HDR) image format and a text format. The step 502 of receiving the operational data includes retrieving data from date wise file data structure. The method 500 further includes, at 504, converting the operational data using a decoder to generate machine-readable data. The machine-readable data is represented in one or more secondary data formats. The decoder is selected based on identity of electric drive generating the operational data. The method 500 also includes determining, at 506, a plurality of events for each of the plurality of drives based on the corresponding machine-readable data. Each of the plurality of events is representative of an operating condition corresponding to the electric drive generating the operational data. The method 500 includes determining, at 508, a plurality of critical events corresponding to the plurality of drives based on analyzing the plurality of events corresponding to each of the plurality of drives using one or more analytic techniques. The plurality of critical events is representative of abnormal operating conditions corresponding to the plurality of drives. The method 500 further includes generating, at 510, a recommendation based on the at least one of the plurality of critical events using a historical knowledge base. In one embodiment, generating the recommendation includes processing the machine-readable data using a machine learning model trained using historical operational data. Specifically, the machine learning model is configured to perform at least one of a classification task and a computation task for generating the recommendation. The recommendation includes a schedule for service. The method 500 also includes, at 512, presenting the recommendation on an output device to the operator in a human readable format.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the invention is not to be seen as limited by the foregoing description, but is only limited by the scope of the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A method for monitoring an industrial plant comprising a plurality of electric drives, the method comprising:
   receiving operational data from each of the plurality of electric drives via a corresponding communication interface, wherein the operational data is represented in one or more pre-determined data formats;
   converting the operational data using a decoder of a plurality of decoders to generate machine-readable data, wherein the machine-readable data is represented in one or more secondary data formats, wherein each decoder of the plurality of decoders decodes a different pre-determined data format of the one or more pre-determined formats to the one or more secondary data formats, and wherein the decoder is selected from the plurality of decoders based on an identity of the electric drive generating the operational data;
   determining a plurality of events for each of the plurality of drives based on the corresponding machine-readable data, wherein each of the plurality of events is representative of an operating condition corresponding to the electric drive generating the operational data;
   determining a plurality of critical events corresponding to the plurality of drives based on analyzing the plurality of events corresponding to each of the plurality of drives using one or more analytic techniques, wherein the plurality of critical events is representative of abnormal operating conditions corresponding to the plurality of drives;

generating a recommendation based on at least one of the plurality of critical events using a historical knowledge base, wherein the recommendation comprises a schedule for service; and presenting the recommendation on an output device to an operator in a human readable format.

2. The method of claim 1, wherein the pre-determined data format comprises at least one of Universal File Format (UFF), Waveform Data Format (WVF), High Dynamic Range (HDR) image format and a text format.

3. The method of claim 1, wherein receiving the operational data comprises retrieving data from date wise file data structure.

4. The method of claim 1, wherein the communication interface is a fiber optic based distributed drive communication system (DDCS) interface.

5. The method of claim 1, wherein the identity of the electric drive comprises an identity number of recording unit of the electric drive, and a type of recording unit of the electric drive.

6. The method of claim 1, wherein generating the recommendation comprises performing at least one of a classification task and a computation task using a machine learning model.

7. The method of claim 1, wherein the plurality of decoders comprise a text decoder and a binary decoder.

8. The method of claim 1, wherein the plurality of decoders correspond to the plurality of electric drives.

9. The method of claim 1, wherein the corresponding communication interface is configured to:

receive the operational data from each of the corresponding electrical drives; and provide the operational data to a cloud infrastructure, wherein receiving the operational data from each of the plurality of electric drives via the corresponding communication interface further comprises:

receiving the operational data via the corresponding communication interface before the corresponding communication interface provides the operational data to the cloud infrastructure.

10. An apparatus for monitoring an industrial plant comprising a plurality of electric drives, the apparatus comprising:

a data receiving unit configured to receive operational data from each of the plurality of electric drives via a corresponding communication interface, wherein the operational data is represented in one or more pre-determined data formats;

a data format converter unit communicatively coupled to the data receiving unit and configured to convert the operational data using a decoder of a plurality decoders to generate machine-readable data, wherein the machine-readable data is represented in one or more secondary data formats, wherein each decoder of the plurality of decoders decodes a different pre-determined data format of the one or more pre-determined formats to the one or more secondary data formats, and wherein the decoder is selected from the plurality of decoders based on an identity of electric drive generating the operational data;

an analytics engine communicatively coupled to the data format converter unit and configured to:

determine a plurality of events for each of the plurality of drives based on the corresponding machine-readable data, wherein each of the plurality of events is representative of an operating condition corresponding to the electric drive generating the operational data;

determine a plurality of critical events corresponding to the plurality of drives based on analyzing the plurality of events corresponding to each of the plurality of drives using one or more analytic techniques, wherein the plurality of critical events is representative of abnormal operating conditions corresponding to the plurality of drives;

generate a recommendation based on at least one of the plurality of critical events using historical knowledge base, wherein the recommendation comprises a schedule for service; and a human-machine interface communicatively coupled to the analytics engine and configured to present the recommendation to an operator on an output device in a human readable format.

11. The apparatus of claim 10, wherein the pre-determined data format comprises at least one of Universal File Format (UFF), Waveform Data Format (WVF), High Dynamic Range (HDR) image format and a text format.

12. The apparatus of claim 10, wherein the operational data is organized in a date wise file data structure.

13. The apparatus of claim 10, wherein the communication interface comprises distributed data communication system (DDCS).

14. The apparatus of claim 10, wherein the identity of the electric drive comprises an identity number of recording unit of the electric drive, and a type of recording unit of the electric drive.

15. The apparatus of claim 10, wherein the analytics engine is configured to perform at least one of a classification task and a computation task via processing of the machine-readable data using a machine learning model.

* * * * *